United States Patent

Suzuki

[19]

[11] Patent Number: 5,877,700
[45] Date of Patent: Mar. 2, 1999

[54] RADIO SELECTIVE CALLING RECEIVER EQUIPPED WITH MESSAGE TRANSMITTING FUNCTIONS AND AUTODIALING

[75] Inventor: Katsuroh Suzuki, Shizuoka, Japan

[73] Assignee: NEC Corporation, Tokyo, Japan

[21] Appl. No.: 700,927

[22] Filed: Aug. 23, 1996

[30] Foreign Application Priority Data

Aug. 24, 1995 [JP] Japan .................................. 7-215551

[51] Int. Cl.⁶ .............................. G08B 5/22; H04Q 7/00
[52] U.S. Cl. .................................. 340/825.44; 455/31.2; 455/460
[58] Field of Search .................. 340/825.44, 825.48, 340/825.69, 825.72, 825.8, 825.79, 825.22; 455/38.4; 379/57, 40, 156, 157

[56] References Cited

U.S. PATENT DOCUMENTS 4,490,579  12/1984  Godoshian  .......................... 340/825.44
5,099,507  3/1992  Mukai et al.  .......................... 455/31.2

FOREIGN PATENT DOCUMENTS 282824  3/1990  Japan .

OTHER PUBLICATIONS

Motorola Publication PMR (2000) Personal Memory Receiver "1986".

*Primary Examiner*—Brian Zimmerman
*Assistant Examiner*—Edward Merz
*Attorney, Agent, or Firm*—Whitham, Curtis & Whitham

[57] ABSTRACT

Number of transmissions is counted for each of the destination telephone numbers and the transmission messages, and the counted number of transmissions is stored in association with the destination telephone number and the transmission messages. After the stored number of transmissions has exceeded a predetermined number, the reaching is notified at a predetermined interval. The telephone number, the transmission message and the number of transmissions are displayed concurrently with the notification, and DTMF signals are automatically produced by operation with keys.

13 Claims, 5 Drawing Sheets

| AREA FOR DESTINATION TELEPHONE NUMBERS | AREA FOR TRANSMISSION MESSAGE | AREA FOR NO. OF TRANSMISSIONS |
|---|---|---|
| 03-9876-5432 | HELLO | 1 |
| 045-678-9123 | CALL | 3 |
| 045-678-9123 | WORK FINISHED | 1 |
| 03-4567-8901 | RETURN TO COMPANY | 2 |
| 03-1234-5678 | CALL | 4 |

RADIO SELECTIVE CALLING RECEIVER EQUIPPED WITH MESSAGE TRANSMITTING FUNCTIONS AND AUTODIALING

BACKGROUND OF THE INVENTION

1. Field of the Invention

This invention relates to a radio selective calling receiver, and more particularly to a radio selective calling receiver equipped with dial tone-generating means which converts telephone numbers, messages, etc. into dial tones and outputs the latter.

2. Description of the Related Art

Autodialing function-equipped paging receivers, that is, paging receivers equipped with message-transmitting functions which convert messages and destination telephone numbers into dial tones and output the tones are described in Japanese Patent Application Disclosure HEI 2-82824, for example. When a message is being sent with this type of receiver, the receiver is put close to the transmitting section of a telephone, and predetermined operations are performed to convert a telephone number into dial tones by an autodialing function and to input the dial tones to the transmitting section. The telephone generates dial tones upon receipt of the input to establish a line connection. Thereafter, the message is converted into dial tones as well and sent through the transmitting section of the telephone.

SUMMARY OF THE INVENTION

It is an object of this invention to provide an improved radio selective calling receiver equipped with a message-transmitting function.

The radio selective calling receiver equipped with a message-transmitting function according to this invention comprises a receiving section for receiving radio signals; an extracting section for extracting received message signals from the received signals; an output section for outputting the received message signals extracted by the extracting section; a memory for storing transmission messages and destination telephone numbers; and a control section for storing the number of transmissions in the memory, in association with the transmission messages and the destination telephone numbers.

The radio selective calling receiver equipped with a message-transmitting function may further comprise a display section for displaying the transmission messages and the destination telephone numbers stored in the memory; a selecting section for selecting a message to be transmitted and a telephone number to be called from the transmission messages and the destination telephone numbers displayed on the display section; and a signal-generating section for providing the output section with the destination telephone number selected by the selecting section.

The control section may update the number of transmissions after the message to be transmitted and the telephone number to be called have been outputted from the memory to the signal-generating section.

Preferably the output section notifies after the number of transmissions has reached a predetermined number for each of the transmission messages and the destination telephone numbers, and the display section displays the transmission message and the destination telephone number which have undergone the predetermined number of transmissions.

As mentioned above, since the radio selective calling receiver equipped with a message-transmitting function according to this invention may store the number of transmissions for each of the transmission messages and the destination telephone numbers which are transmission data, the carrier may easily ascertain the number of transmissions.

In addition, simple autodialing is allowed by mere selection of the displayed transmission data.

Furthermore, since a sounder notifies of transmission data which has been transmitted many times, the carrier is advised of the transmission data to be transmitted again.

BRIEF DESCRIPTION OF THE DRAWINGS

These and other objects, features and advantages of this invention will become more fully apparent from the following detailed description taken with the accompanying drawings in which:

FIG. 2 is a view illustrative of an example of the configuration of the transmission message management memory shown in FIG. 1;

In the drawings, the same reference numerals denote the same structural elements.

DESCRIPTION OF THE PREFERRED EMBODIMENTS

Figure 1:
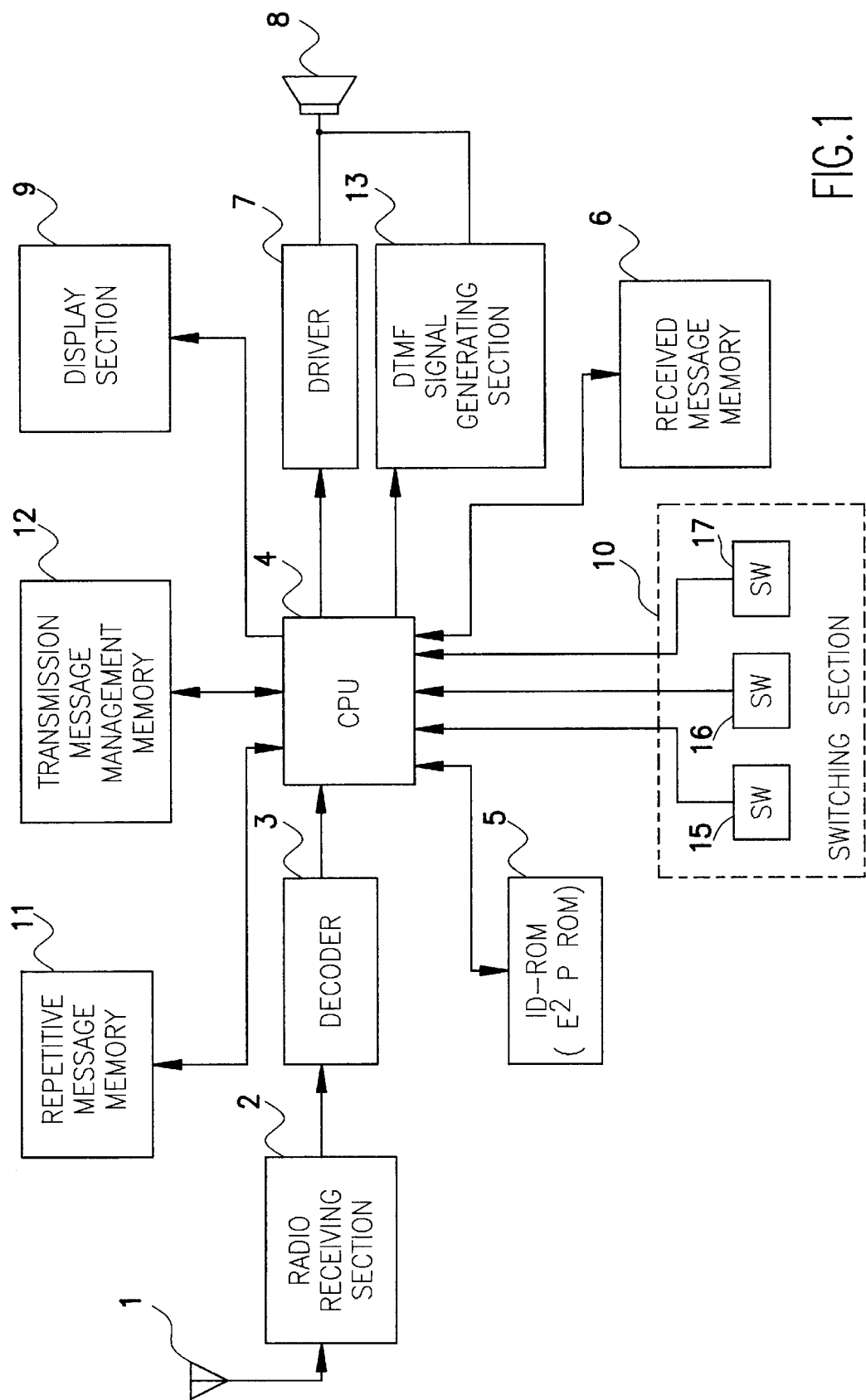
FIG. 1 is a schematic block diagram illustrative of a radio selective calling receiver equipped with a display which is an embodiment of this invention.

FIG. 1 is a schematic block diagram illustrative of a radio selective calling receiver equipped with a display which is an embodiment of this invention.

The radio selective calling receiver equipped with a message-transmitting function is constructed of an antenna 1, a radio-receiving section 2, a decoder 3, a CPU 4, a received-message memory 6, a driver 7, a speaker 8, a display section 9, a switching section 10, a repetitive-message memory 12 and a DTMF signal-generating section 13. The switching section 10 comprises a first switch 15, a second switch 16 and a third switch 17.

A radio calling signal received via the antenna 1 is demodulated through the radio-receiving section 2, and the demodulated signal is provided to the decoder 3. The decoder 3 inputs the calling number (ID) assigned thereto, which has been prestored in the ID-ROM 5, via the CPU 4 for comparison with the calling number contained in the demodulated signal. when the comparison indicates a mismatch, the signal is no longer processed on the judgement that the received radio calling signal is not addressed thereto. On the other hand, in cases where a match has occurred, on the judgement that the received radio calling signal is addressed thereto, a message signal which follows the calling number is received, and the demodulated message signal is outputted to the CPU 4.

The CPU 4 stores the message signal from the decoder 3 in the received-message memory 6. In addition, the CPU 4 activates the driver 7 to sound the speaker 8 and to display the received message on the display section 9. This performance notifies the carrier of the call.

The repetitive-message memory 11 is a memory which stores a plurality of repetitive messages. When the received message includes a shortened code for any of the repetitive messages, the CPU 4 reads the repetitive message which corresponds to the contained shortened code from the repetitive-message memory 11 to display the repetitive message on the display section 9.

The transmission message management memory 12 is a memory for storing a management table of the stored destination telephone numbers, transmission messages and the number of transmission. The stored management table is displayed on the display section 9 by operating the switching section 10.

The DTMF signal-generating section 13 converts the telephone numbers and the transmission messages stored in the transmission message management memory 12 into DTMF signal tones which are outputted through the speaker 8. The destination telephone number and the transmission message to be transmitted may be selected by operating the switching section 10.

FIG. 2 is a view illustrative of an example of the configuration of the transmission message management memory shown in FIG. 1;

The transmission message management memory 12 are divided into three areas: area for destination telephone numbers, area for transmission messages and area for the number of transmission. Entered destination telephone numbers are stored in the area for destination telephone numbers. Transmission messages which have been transmitted are stored in the area for transmission messages, associated with the destination telephone numbers. The number of transmissions are stored in the area for the number of transmissions, associated with the destination telephone numbers and the transmission messages.

In other words, the same destination telephone numbers are stored each time different transmission messages are transmitted thereto.

Figure 3:
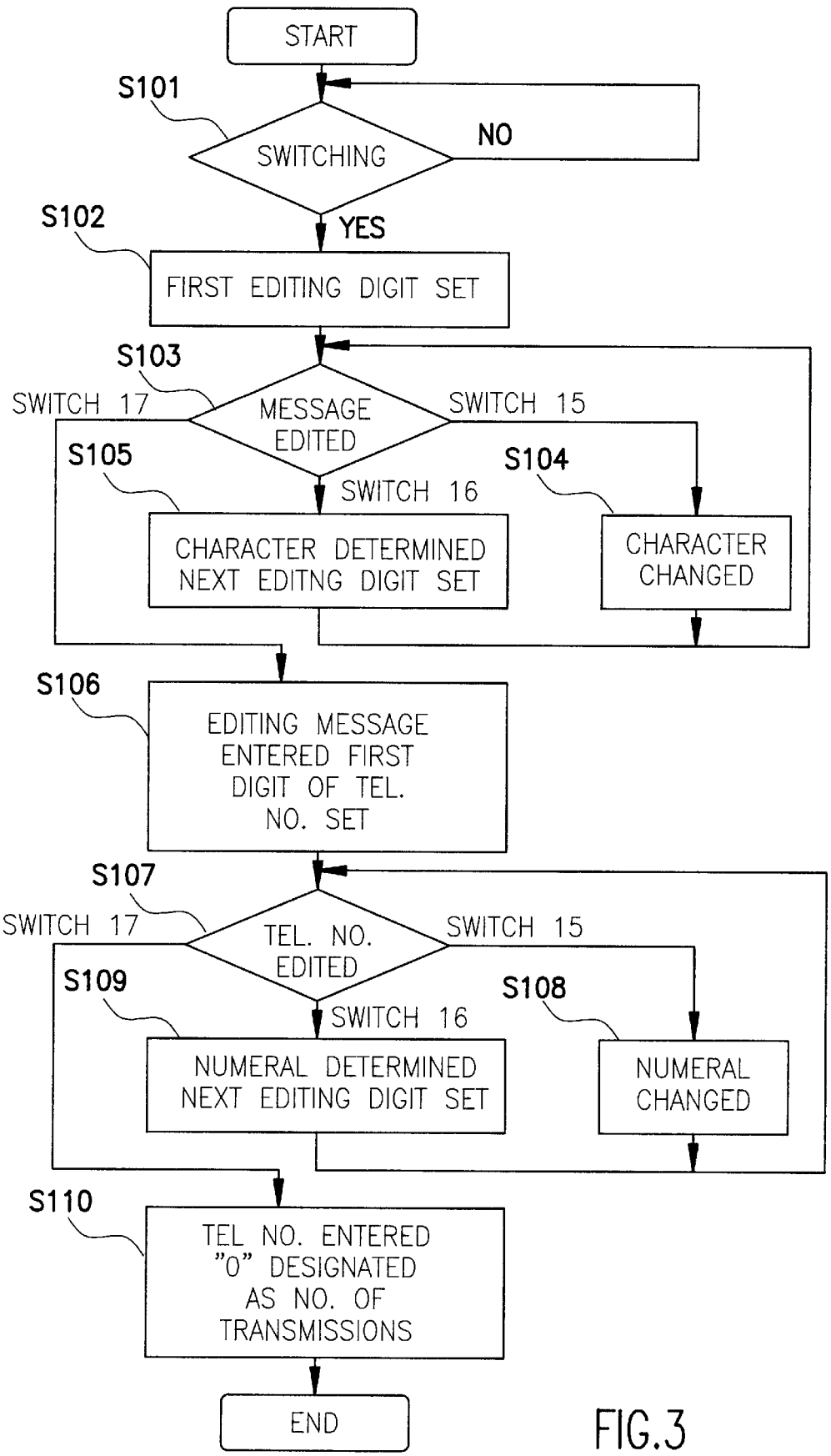
FIG. 3 is a flow chart illustrative of the operation for storing transmission messages and destination telephone numbers in the transmission message management memory.

An explanation will now be made regarding the operation for entering transmission messages and destination telephone numbers in the transmission message management memory, with reference to Fig. 3.

Referring to the drawing, the CPU 4 goes into the transmission message-editing mode when the switching section 10 is operated (step S101). The editing of transmission messages is inputting of transmission messages and destination telephone numbers to be entered. Although either the transmission messages or the destination telephone numbers may be edited first, the transmission messages are edited first according to the present embodiment.

When placed in the transmission message-editing mode, the first digit of a transmission message is set (step S102), and it is judged whether the switching section 10 is operated (step S103). The switching section 10 comprises three switches 15, 16 and 17, for example. The switch 15 is used to change the characters, while the switch 16 and the switch 17 are used to determine and enter characters, respectively. More specifically, it is judged in step S103 whether the characters are changed, determined or entered.

In step S103, when the switch 15 is operated, the character displayed on the display section 9 is changed (step S104). An example of entry will now be explained with reference to a case where "HELLO" is shown in the area for transmission messages in FIG. 2. Here, since the character to be set as the first digit is an "H", the displayed character is changed with the switch 15 until it becomes an "H". When the "H" is displayed on the display section 9 and the switch 16 is operated, the "H" is determined as the first digit for entry, and the next editing digit is set (step S105). Since the character to be selected as the second digit is an "E", the switch 16 is operated to determine the character as the second digit when an "E", is displayed by operation with the switch 15. An additional "L", "L" and "O" as the digits up to the fifth digit are likewise determined by operation with the switches 15 and 16.

When all the characters to be stored are determined, the switch 17 is operated to store the edited message "HELLO" in the area for transmission messages in the transmission message management memory 12, and after this the mode is switched to editing of destination telephone numbers, and the first digit of a telephone number is set (step S106).

Then, since the telephone number is edited by operating the switching section 10, it is judged which switch is to be operated (step S107). The editing of the telephone numbers is performed in the same manner as the edition of the messages. Specifically, the displayed number is changed with the switch 15, and the number is determined and stored with the switches 16 and 17, respectively. For example, when the telephone number "03-9876-5432" is being stored in association with the transmission message "HELLO", the switch 15 is first operated to display a "0" (step S108), and the switch 16 is then operated to determine the numeral and to set the next digit (step S109). The foregoing operation is performed until all the numerals of the telephone number including the hyphen "-" are determined. Here, it is assumed that numerals 0-9 and hyphens may be displayed by operation with the switch 15.

When the telephone number to be stored is determined in step S107, the telephone number determined by operation with the switch 17 is stored in the area for destination telephone numbers in the transmission message management memory 12 (step S110). Likewise, "0" is designated as the number of transmission, and an "0" is stored in the area for the number of transmissions.

As described above, a variety of sets of associated transmission messages and destination telephone numbers are stored, and the number of transmissions "0" is designated for each of the sets.

Figure 4:
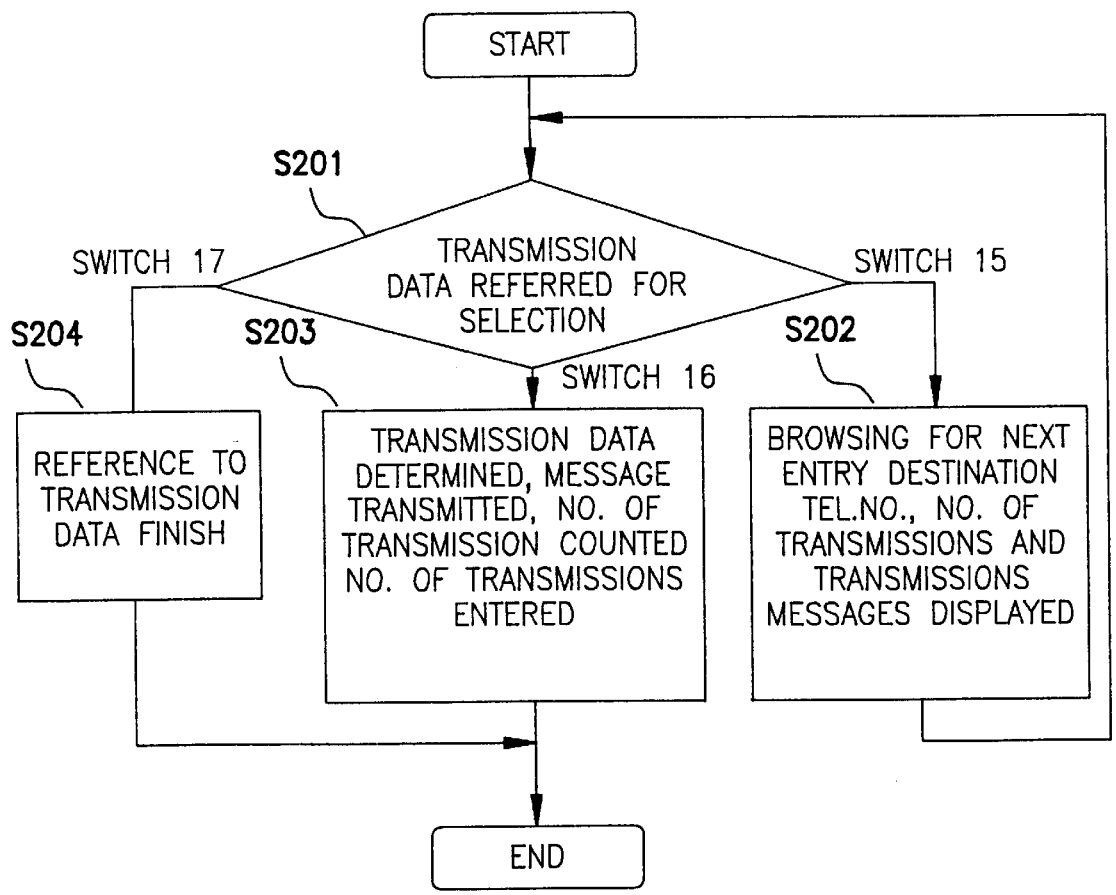
FIG. 4 is an operational flow chart illustrative of the operation for displaying and transmitting the stored transmission messages and the operation for counting the number of transmissions.

FIG. 4 is an operational flow chart illustrative of the operation for displaying and transmitting the stored transmission messages and the telephone numbers (hereunder referred to as "transmission data" collectively) and the operation for counting the number of transmissions.

Referring to the drawing, the switching section 10 is operated to read the transmission data from the transmission message management memory 12 and to display it on the display section 9. Here, for example, it is assumed that a transmission message "CALL" is being transmitted to "045-678-9123" which is the destination telephone number stored second in the area for transmission messages which is illustrated in FIG. 2.

Transmission data to be transmitted is first selected while the transmission data is displayed (step S201). Here, the transmission data is selected by operation with the switch 15 (step S202). Specifically, a single operation of the switch 15 results in selection of the second transmission data.

After the transmission data to be transmitted has been selected, the switch 16 is operated to determine the transmission data, and the telephone number and the transmission message are outputted as DTMF signals from the DTMF signal-generating section 13 (step S203). After outputting of the DTMF signals of the telephone number and the transmission message has been finished, the CPU 4 updates the number of transmissions, and the updated number of transmissions is stored in the area for the number of transmissions. For example, the number of transmissions "0" is changed to "1, and "2" to "3". FIG. 2 illustrates the case where the transmission message "CALL" was transmitted to the destination telephone number "045-678-9123" three times.

In step S201, the display of the transmission data is finished when the switch 17 is operated (step S204).

The number of transmissions is automatically updated in this way each time the entered transmission data is transmitted. As a result, the carrier need not remember the number of transmissions of the same messages to the same destinations; all that is needed is browsing through the transmission data.

Figure 5:
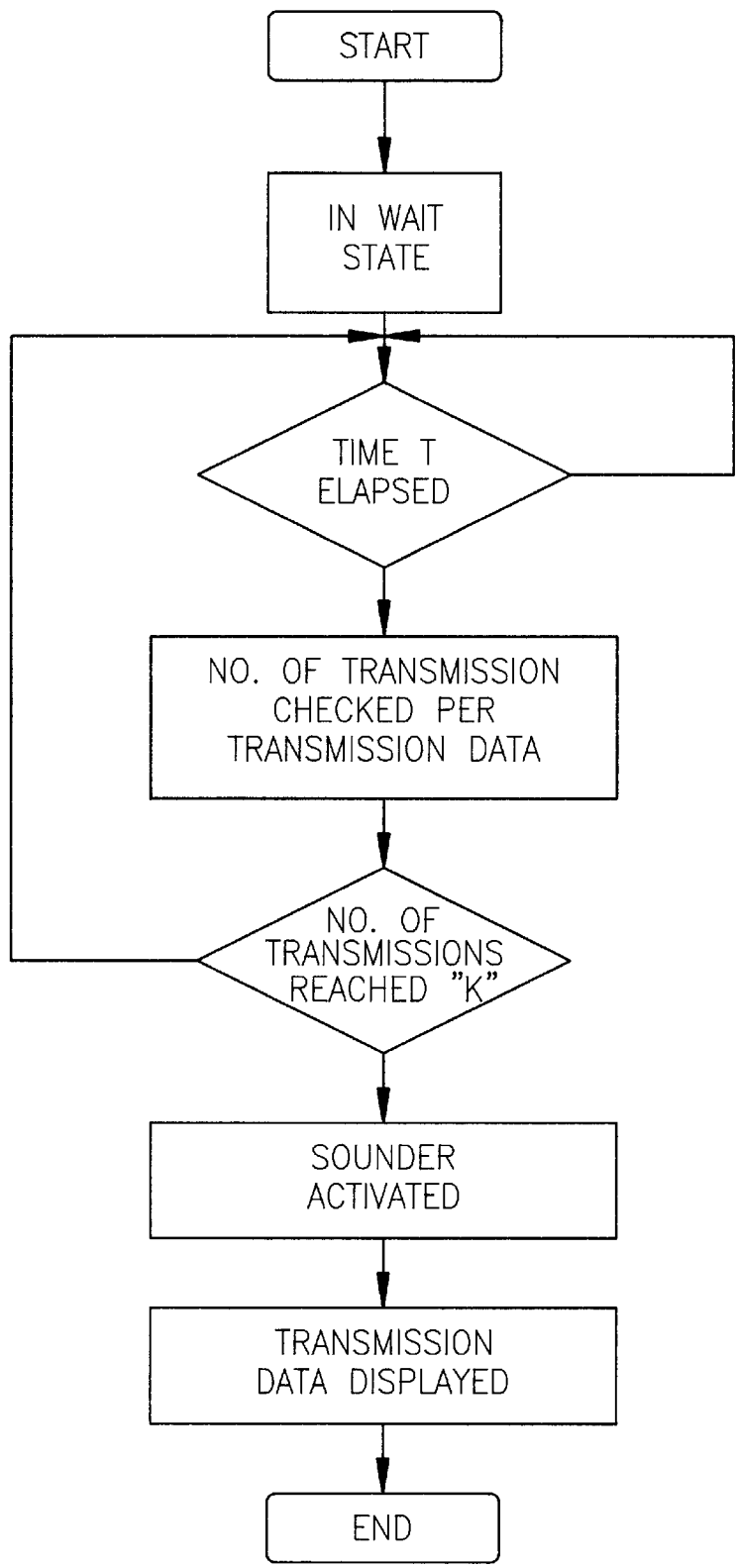
FIG. 5 is an operational flow chart of the operation for activating a sounder.

In addition, this invention allows automatic activation of a sounder when the number of transmissions has exceeded a predetermined number, to advise the carrier of the need to retransmit the particular message. This is because a message transmitted many times is often one for which an urgent response is expected by the called party but has failed, and therefore the carrier must constantly repeat the transmission for response until being notified of the response. Constant concern by the carrier for retransmission, however, tends to prevent concentration of attention on work. Therefore, when a sounder is designed to be activated after a predetermined time has elapsed according to this invention, the carrier need not remember to retransmit the message. An explanation will now be given regarding the operation of the CPU 4 in order to accomplish this aim, with reference to FIG. 5.

First, in the wait state, that is, during the ON state of the power supply, the CPU 4 judges whether a predetermined time t has elapsed (step S301). When the time t is judged to have elapsed, the number of transmissions of the transmission data stored in the transmission message management memory 12 is checked (step S303). It is judged whether the number of transmissions of the stored transmission data is greater than a predetermined number k of transmissions (step S304), a sounder is activated through the speaker 8 when the transmission data has been transmitted k or more times (step S305), and the transmission data is displayed on the display section 9 (step S306).

Since the carrier, being notified at an established interval of the transmission data to be transmitted, remembers the need to retransmit the data, and the transmission data to be selected is displayed in this way, the retransmitting is facilitated.

Although it is judged according to the foregoing embodiment whether a predetermined time has elapsed in the wait state, the judgement may depend on the passage of a predetermined time starting with a first transmission of the transmission data.

Also, according to the embodiment described above, the number of transmissions of the transmission data which the carrier need not transmit any more is desired to be initialized to "0".

As described above, since the radio selective calling receiver equipped with a message-transmitting function according to this invention may store the number of transmissions of the transmission data for each of the destination telephone numbers and the messages, the carrier is free from the inconvenience of memorizing or making a memo thereof.

In addition, since transmission is possible by mere selection of the displayed transmission data, autodialing is accomplished in a simple manner.

Further, since a sounder is activated after a lapse of a predetermined time for transmission data transmitted many times, the carrier is notified of the need to retransmit the transmission data.

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. A radio selective calling receiver equipped with a message-transmitting function comprising:

receiving means for receiving radio signals;

extracting means for extracting received message signals from said received signals;

output means for outputting said received message signals extracted by said extracting means;

storing means for storing transmission messages and destination telephone numbers; and control means for storing the number of transmissions of each of said transmission messages in said storing means, in association with respective transmission messages and said destination telephone numbers.

2. A radio selective calling receiver equipped with a message-transmitting function, as claimed in claim 1, which further comprises:

displaying means for displaying said transmission messages and said destination telephone numbers stored in said storing means;

selecting means for selecting a message to be transmitted and a telephone number to be called from the transmission messages and the destination telephone numbers displayed on said displaying means; and signal-generating means for providing said output means with the destination telephone number selected by said selecting means.

3. A radio selective calling receiver equipped with a message-transmitting function, as claimed in claim 2, wherein said control means updates said number of transmissions after said message to be transmitted and said telephone number to be called have been outputted from said storing means to said signal-generating means.

4. A radio selective calling receiver equipped with a message-transmitting function, as claimed in claim 3, wherein said output means notifies a carrier after said number of transmissions has reached a predetermined number.

5. A radio selective calling receiver equipped with a message-transmitting function, as claimed in claim 4, wherein the notification by said output means is performed at a predetermined interval.

6. A radio selective calling receiver equipped with a message-transmitting function, as claimed in claim 4, wherein the notification by said output means is performed at a predetermined interval after said number of transmissions has reached a predetermined number.

7. A radio selective calling receiver equipped with a message-transmitting function, as claimed in claim 4, wherein said output means notifies a carrier after said number of transmissions has reached a predetermined number, and said displaying means displays the transmission message and the destination telephone number which have undergone said predetermined number of transmissions.

8. A method of controlling transmission of messages with a radio selective calling receiver, which comprises:

receiving radio signals;

extracting received message signals from the received radio signals;

outputting said extracted, received message signals;

storing transmission messages and destination telephone numbers; and storing a number of transmissions of each of said transmission messages, in association with respective transmission messages and said destination telephone numbers.

9. A control method as claimed in claim 8, which further comprises:

displaying said transmission messages and said destination telephone numbers stored;

selecting a message to be transmitted and a telephone number to be called from the displayed transmission messages and the destination telephone numbers; and converting the selected destination telephone number into signals for outputting.

10. A control method as claimed in claim 9, wherein said number of transmissions is updated after said message to be transmitted and said telephone number to be called have been outputted.

11. A control method as claimed in claim 9, wherein notification of a carrier is performed after said number of transmissions has reached a predetermined number.

12. A radio selective calling receiver as recited in claim 1, further including switch means for selecting and controlling output of a said transmission message.

13. A control method as recited in claim 8, including the further step of controlling output of a said transmission message.

* * * * *